Jan. 22, 1963 W. F. CLEMENCY 3,075,045
SPEAKERPHONE
Filed Aug. 29, 1960
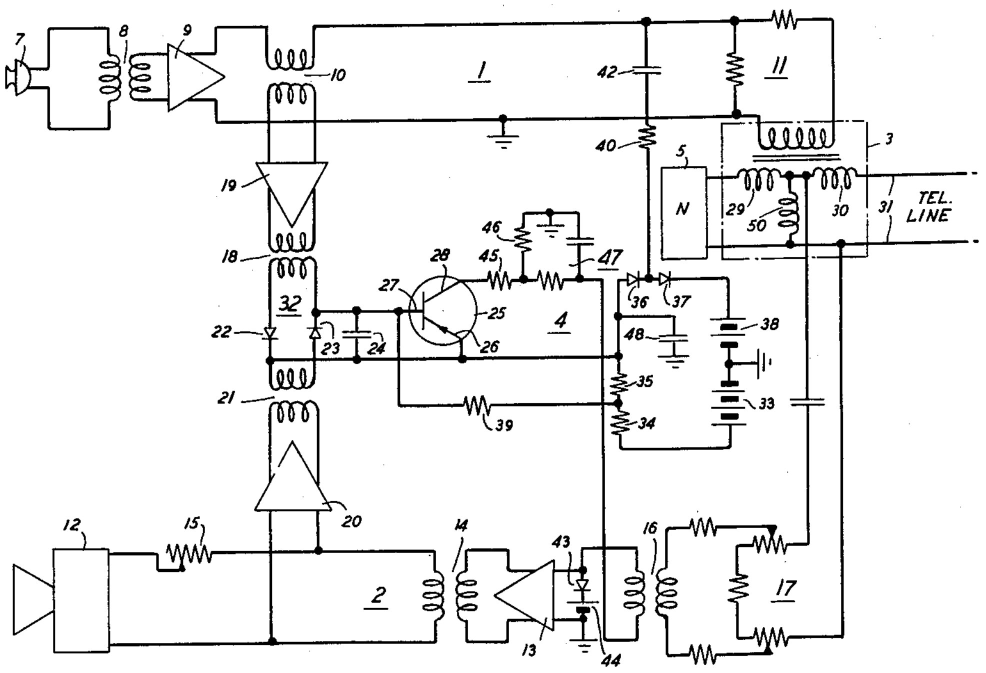
INVENTOR
W. F. CLEMENCY
BY V. P. Priolo
ATTORNEY 3,075,045
Patented Jan. 22, 1963

3,075,045

SPEAKERPHONE

William F. Clemency, Murray Hill, N.J., assignor to Bell Telephone Laboratories, Incorporated, New York, N.Y., a corporation of New York Filed Aug. 29, 1960, Ser. No. 52,614
6 Claims. (Cl. 179—1)

This invention relates to voice communication systems, and more particularly concerns telephone substations utilizing microphones and loudspeakers, respectively, as input and output transducers.

Loudspeaking telephone sets, generally referred to as speakerphones, are characterized by a transmitting channel including a microphone and a receiving channel including a loudspeaker. Due to the presence of this apparatus, speakerphones, in addition to being susceptible to the problem of sidetone coupling, which is common to both conventional telephones and loudspeaking sets alike, inherently give rise to another feedback problem known as acoustic or room coupling. In the case of sidetone coupling, an imperfectly balanced hybrid circuit provides a path for electrical signals propagating in the transmitting channel to be coupled to the receiving channel, converted by the loudspeaker into sound, and redetected by the microphone. If the coefficient of sidetone coupling reaches a sufficient magnitude, an unstable condition known as "singing" occurs. In the case of acoustic coupling, on the other hand, sound produced by a speakerphone's loudspeaker is detected by the set's microphone and transmitted back to a remote talker as objectionable echo.

To overcome the foregoing difficulties, apparatus has heretofore been included in speakerphones for alternately attenuating energy in one of the two channels while the other remains at maximum gain. In one such arrangement, familiar to those skilled in the art as a voice switched system, means are provided for sensing voice signals propagating through either of the channels, and a control circuit, operative in response to these sensed signals, switches a high loss element into the idle one of the channels. In the event that both channels are concurrently energized by voice frequency signals of at least a predetermined saturation magnitude, signals in a preselected one of the channels are passed undiminished, while signals in the other are highly attenuated. In my copending application, Serial No. 783,417, filed December 29, 1958, now United States Patent 3,046,354, issued July 24, 1962, for example, if energy propagating in the receiving channel reaches saturation level, that channel remains at full gain regardless of the level of energy present in the transmitting channel.

The level of energy at which the preselected channel assumes complete control of the transmission state of a speakerphone represents the dynamic range of the set, that is to say, for levels of voice frequency energy below saturation, either the local or the remote subscriber to a telephone call may interrupt the other by raising his voice. Once the saturation level is reached, however, one of the parties, depending on which channel is preselected, is precluded from breaking in on the speech of the other. If, for example, the receiving channel is preselected to remain at full gain when energized by signals at the saturation level, as in my previously mentioned copending application, a subscriber is unable to remove a high loss element from his transmitting channel while the saturation level of energy appears in his receiving channel, a situation known in the art as "transmit lockout." Since voice frequency energy appearing in a channel due to either sidetone coupling or noise present on a telephone line may, in certain circumstances, be considerable, it is desirable to render the saturation level of voice switched speakerphones relatively high in order to prevent transmit lockout from occurring in response to spurious energy.

Accordingly, it is one object of the invention to increase the dynamic range of a loudspeaking telephone set.

It is another object of the invention to raise the level of energy which when present in one channel of a speakerphone prevents the other channel from becoming substantially operative.

It is a further object of the invention to reduce the size, complexity and cost of voice switched speakerphones. In this regard it is an additional object of the invention to provide a voice switched speakerphone set utilizing a minimum number of semiconductor elements.

According to the invention in one of its important aspects, a speakerphone set is equipped with variable impedance elements connected to dissipate controllable quantities of energy propagating through its transmitting and receiving channels, and sensing means are provided to derive a signal representative of the difference in energy levels appearing in the aforementioned channels for controlling the magnitude of impedance exhibited by the variable impedance elements.

In one of its features the invention includes apparatus for deriving a control signal proportional to the difference in energy levels appearing concurrently in the transmitting and receiving channels of a speakerphone, and applying that control signal to a transistor switching circuit which, in turn, regulates attenuation of voice frequency signals propagating in the aforementioned channels. In one embodiment of this feature, to which the invention is by no means restricted, sensing elements are connected to separately detect energy in both channels. Signals detected from the respective channels are applied to oppositely poled rectifiers through which a storage capacitor is either charged or discharged depending upon which channel is passing a greater quantity of energy. The storage capacitor is connected between the base and collector electrodes of a transistor, the state of conduction of which is determined by the potential stored across the capacitor. In the event that channel energy distribution is such that the capacitor back biases the transistor, a path is provided for current to flow through a current controlled variable impedance device bridged across one of the channels. If, on the other hand, the transistor is forward biased by the capacitor, current is diverted through the emitter-to-collector path of the transistor and energizes a current controlled variable impedance path in shunt with the other channel.

As another of its features, the invention includes apparatus for increasing the sensitivity of the voice switching circuit comprising a high impedance amplifier serially connected to a signal sensing element in at least one of the speakerphone's communication channels. In one arrangement characterizing this feature, a pentode amplifier energized by the set's microphone is utilized to drive the transmitting channel. Connected in the pentode's plate circuit in series with the remainder of the channel circuitry is the primary coil of a transformer which detects signal energy propagating through the channel and applies it to a rectifier to derive a unidirectional signal proportional to the detected energy. Since a pentode is a high impedance amplifier, its output signal current is relatively unaffected by load impedance variations, thereby preventing the additional load presented by the series transformer from materially attenuating transmitted energy. In addition, a transformer when arranged in series with a channel is not subject to desensitization by a subsequent low impedance shunt element.

As still another of its features, a circuit arrangement is provided by the invention for preventing the impedance exhibited by a speakerphone's variable impedance elements from being modulated by voice frequency energy propagating in either the transmitting or receiving channels. In a preferred configuration, the voice switched variable impedance elements comprise semiconductor diodes separately bridged across the transmitting and receiving channels. A first source of electrical potential is connected to alternately forward bias either the transmitter or receiver diodes depending upon the state of the transistor switching circuit. To prevent impedance modulation, second and third sources of potential are provided for reverse biasing the diodes when not forward biased by the first source. The second and third sources are of sufficient magnitdue to prevent voice frequency energy propagating in a channel from overriding the reverse bias condition of variable impedance diodes associated with that channel. The first source, on the other hand, is of sufficient magnitude to overcome the reverse-bias effect of the second and third sources, thereby forward biasing diodes to which it is applied.

In addition to those features already pointed out, the invention also includes apparatus for reducing the volume of objectionable sounds caused by transient surges of current concomitant with rapidly switched transistors. Such apparatus, in one form comprising low pass filters separately connected to both emitter and collector electrodes of the transistor, provide a path for shunting high frequency transient energy around both the transmitting and receiving channel variable impedance elements. As a still further feature of the invention, a temperature compensation circuit is connected to the transistor's collector electrode in order to prevent, over the temperature range contemplated, leakage currents from influencing the impedance exhibited by the variable impedance elements.

The foregoing and other objects and features of the invention will be more thoroughly understood by reference to the following detailed description of one illustrative embodiment of the invention and the single drawing depicting a speakerphone set including an improved voice switching circuit arranged in accordance with the invention.

With reference now directed to the drawing, a speakerphone set, arranged in accordance with the principles of the invention, is illustrated comprising a transmitting channel 1, a receiving channel 2, a hybrid circuit 3, and a switching circuit 4 operative to insert a high loss impedance element into either the transmitting or receiving channel in accordance with the distribution of voice energy. As shown in the drawing, transmitting channel 1 comprises a microphone 7 coupled to hybrid circuit 3 through a transformer 8, an amplifier 9, primary coil of transformer 10, and resistance pad 11 in that order. While amplifier 9 may have any of a number of well-known configurations, a preferred embodiment assumes the form of a high impedance output amplifier, a pentode for example. The primary coil of transformer 10 has one of its leads connected to an output terminal of amplifier 9 and the other connected to resistance pad 11, thereby being arranged in series with channel 1. Another output terminal of amplifier 9 is connected to a reference potential shown in the drawing as ground.

Receiving channel 2 comprises a loudspeaker 12 coupled to hybrid circuit 3 through rheostat 15, transformer 14, amplifier 13, transformer 16, and balanced resistive network 17 in that order. Rheostate 15 is arranged in series with receiving channel 2, having its wiper arm connected to one terminal of loudspeaker 12, and one lead of its resistor connected to the secondary coil of transformer 14. The secondary coil of transformer 16 has one of its terminals connected to an input lead of amplifier 13, while the other is connected, as will subsequently be described in detail, to switching circuit 4.

Hybrid circuit 3 is of conventional bridge design having coils 29 and 30 as two of its four legs, while the other two comprise telephone line 31 and network 5. Network 5, as is fully disclosed in Patent 2,801,287 granted to me on July 30, 1957, automatically adjusts its impedance to match the impedance of telephone line 31. As is conventional in telephone practice, transmitting channel 1 is transformer coupled to the hybrid circuit across windings 29 and 30, while receiving channel 2 is connected to the hybrid circuit between the junction of windings 29 and 30, and the junction of the network 5 and telephone line 31. Connected across the receiving channel is an inductor 50 which while providing a low impedance path for direct-current, exhibits a high impedance for alternating current.

Amplifier 19, coupled to the secondary coil of transformer 19, is connected to sense energy propagating in transmitting channel 1 and apply it to summing circuit 32 through transformer 18. Amplifier 20, bridged across receiving channel 2 at a point between potentiometer 15 and transformer 14, is arranged to sense enregy propagating in the receiving channel and apply it to summing circuit 32 through transformer 21.

Summing circuit 32 comprises the secondary windings of transformers 18 and 21 coupled together through diodes 22 and 23. The secondary of transformer 18 has one lead connected to the anode of diode 22 while the other is connected to the cathode of diode 23. Similarly, the leads of the secondary of transformer 21 are respectively connected to the cathode of diode 22 and the anode of diode 23. Bridged across summing circuit 32 between the cathodes of diodes 22 and 23 is transistor switching circuit 4 comprising storage capacitor 24 and transistor 25 having emitter electrode 26, base electrode 27, and collector electrode 28. Capacitor 24 is connected in parallel with the base-to-emitter path of transistor 25. Bias potential for transistor 25 is supplied by an arrangement comprising battery 33, resistors 34 and 35, diodes 36 and 37, and battery 38, serially connected in that order. Battery 33 and diodes 36 and 37 are poled in a like direction with respect to each other, while battery 38, on the other hand, is poled in the opposite direction. The negative terminals of batteries 33 and 38 are connected to a common reference point depicted in the drawing as ground. As shown schematically, the potential of battery 33 is substantially greater than that of battery 38, thereby providing normal current flow through resistors 34 and 35 and diodes 36 and 37. While emitter 26 receives bias energy through a tap at the junction of resistor 35 and diode 36, base 27 is biased through resistor 39 which is connected to the junction of resistors 34 and 35. Resistor 39 has a resistance value sufficient to hold transistor 25 in its high impedance condition in the absense of a switching signal from summing circuit 32.

Separately connected in shunt with both the transmitting and receiving channels are variable impedance circuits including high loss conduction elements comprising resistor 40 and blocking capacitor 42, associated with the former, and diode 43 in series with battery 44 associated with the latter. Resistor 40 bridges the junctions intermediate the primary winding of transformer 10 and resistance pad 11, and intermediate diodes 36 and 37, while diode 43 and battery 44 shunt the input terminals of amplifier 13. As shown, battery 44 is poled in a direction to back bias diode 43. In order to provide a path for direct current to flow from battery 33 through transistor 25 to forward bias diode 43, collector 28 is connected through an attenuation pad comprising resistors 45 and 46, and low pass filter 47 to the lead of the secondary winding of transformer 16 which, as was previously noted, is attached to switching circuit 4. Although as illustrated, transistor 25 assumes the configuration of a PNP semiconductor element, it is apparent to one skilled in the art that by merely reversing the polarity of several of the circuit components an NPN element finds equally convenient use in a speakerphone set arranged in accordance with the principles of the invention. Connected to emitter electrode 26 is capacitor 48 which, together with resistors 34 and 35, comprise a low pass filter for preventing the flow of high frequency transient currents from battery 33 through diodes 36 and 37.

In its quiescent state, the speakerphone resides in a receiving mode, that is to say, resistors 34, 35 and 39 are proportioned to bias transistor 25 to its high impedance condition thereby preventing current flow operative to forward bias diode 43, while at the same time, due to the relative magnitudes of batteries 33 and 38, diodes 36 and 37 are forward biased. Thus, back biased diode 43 allows voice signals coupled to receiving channel 2 to propagate substantially undiminished to loudspeaker 12, while diodes 36 and 37, on the other hand, couple high loss element 40 to alternating current ground through either battery 38 or capacitor 48 thereby providing substantial attenuation to voice signals propagating in transmitting channel 1.

When a remote subscriber places a call to the party whose speakerphone is as pictured in the drawing, voice frequency energy is coupled from hybrid circuit 3 to loudspeaker 12 through resistance network 17, transformer 16, amplifier 13, transformer 14, and rheostat 15. The wiper arm of potentiometer 15 is positioned to affix a desired volume to loudspeaker 12 in accordance with the reverberatory properties of the room in which the set is situated. The magnitude of battery 44 is selected to provide strong enough back bias to prevent any voice signals coupled to transformer 16 from modulating the impedance of diode 43 while the set is operative in its receiving mode. In addition, battery 44 in conjunction with resistor 46 also functions to prevent leakage current from transistor 25 from erroneously forward biasing diode 43. While the magnitude of battery 44 may vary depending, among other things, upon the amplitude of received signals, a value of 1.4 volts has been found satisfactory.

In addition to being coupled to loudspeaker 12, a portion of energy propagating through receiving channel 2 is applied to summing circuit 32 through amplifier 20. Diode 23 serves as a half wave rectifier for charging storage capacitor 24 such that base 27 is rendered positive with respect to emitter 26. In this way, transistor 25 is maintained in its high impedance condition in the absence of a greater quantity of speech energy in the transmitting channel than that present in the receiving channel.

If the local party to the conversation wishes to interrupt speech of the remote party, he does so by speaking into microphone 7. Voice frequency signals translated by amplifier 9 are sensed by transformer 10 and applied through amplifier 19 to summing circuit 32. Diode 22 serves as a half wave rectifier functioning to charge storage capacitor 24 with a polarity directed to shift transistor 25 to its low impedance condition. Being connected in series with the transmitting channel, transformer 10 is considerably more sensitive to propagating energy than if arranged in a shunt configuration. This is evident in that if amplifier 9 is in its preferred configuration of a high impedance output amplifier, often characterized as a constant current generator, load current remains substantialy constant regardless of the impedance terminating the transmitting channel. Were transformer 10 connected in parallel with transmitting channel 1, a shunt connected low impedance element, such as resistor 40, for example, would load the transformer and thereby markedly decrease the quantity of detectable current flowing through the transformer.

When sufficient energy appears in transmitting channel 1, transistor 25 becomes forward biased, thereby providing a low impedance path for current to flow from battery 33 to ground through resistors 34 and 35, the emitter-to-collector path of the transistor, resistance 45, high pass filter 47, secondary coil of transformer 16, diode 43, and battery 44. The potential of battery 33 being substantially greater than that of battery 44, diode 43 is strongly forward biased thereby presenting a high loss attenuating element in receiving channel 2 for preventing voice signals coupled to transformer 16 from reaching loudspeaker 12. Low pass filter 47 reduces objectionable sounds emanating from loudspeaker 12 by shunting to ground high frequency transients which would otherwise be applied to amplifier 13 when transistor 25 switches to a low impedance state. At the same time that receiving channel 2 switches to a high loss condition, increased current flow through resistors 34 and 35 decreases the potential of emitter 26 to a value substantially below that of battery 38. Accordingly, diodes 36 and 37 are switched to a high impedance state thereby preventing a loss element 40 from attenuating signal energy propagating in the transmitting channel. In addition, if the circuit components are proportioned to provide emitter 26 with a potential substantially below that of battery 38, ten volts for example, the resulting strong back bias of diodes 36 and 37 prevents signals translated by amplifier 9 from modulating the impedance of the transmitting channel's variable impedance circuit. While the magnitudes of batteries 33 and 38 are not critical, values of 35 volts and 21 volts, respectively, have been found satisfactory.

In order for the remote party to the call to interrupt speech of the local party, the former merely talks into his microphone. Due to both the fluctuating nature of speech and the quiescent bias condition of transistor 25, diode 43 is not maintained in its maximum low impedance condition during the entire message of the local party. Due to the momentary switching of transistor 25 in response to transistory redistribution of channel energy, strong syllables applied by hybrid circuit 3 to transformer 16 which appear in coincidence with weak syllables or silence in transmitting channel 1 are coupled to amplifier 13 relatively unattenuated. Energy translated by amplifier 13 and transformer 14 is detected by amplifier 20, applied to summing circuit 32, and, if sustained, charges capacitor 24 with a polarity directed to switch transistor 25 to its high impedance condition. With transistor 25 switched to its high impedance condition, the potential of emitter 26 is raised, thereby allowing battery 33 to once again forward bias diodes 36 and 37. The low pass filter including capacitor 48 shunts to ground high frequency transient currents which would otherwise flow through diodes 36 and 37 and thus be applied to the transmitting channel to create objectionable sounds at the remote subscriber's loudspeaker. In similar fashion, the local party can interrupt the remote party by merely raising his voice to provide a level of energy in the transmitting channel which exceeds that in the receiving channel. Thus, by means of the invention, a voice switched speakerphone set is provided having a dynamic range, the only practical limit of which is the dynamic range of the channel amplifiers.

While only a single embodiment of the invention is described herein, it is quite evident that numerous other arrangements of components may be devised without departing from the spirit and scope of the invention.

What is claimed is:

1. A loudspeaker telephone set comprising a transmitting channel including a microphone, a receiving channel including a loudspeaker, hybrid means for electrically coupling said transmitting channel and said receiving channel to a telephone line, first variable impedance means connected to dissipate at least a portion of energy propagating through said transmitting channel, second variable impedance means connected to dissipate at least a portion of energy propagating through said receiving channel, at least one relatively high impedance amplifier connected in said transmitting channel, first detecting means connected to said amplifier for sensing energy propagating in said transmitting channel, said first detecting means being coupled to said transmitting channel by means of a transformer having its primary coil connected in series with said transmitting channel, second detecting means for sensing energy propagating in said receiving channel, a transistor switching circuit connected to inversely vary the quantities of energy dissipated by said first and second impedance means, said circuit including a transistor having a base electrode, an emitter electrode, and a collector electrode, a storage capacitor for controlling the state of said switching circuit connected between said base and emitter electrodes, a first unidirectional current conducting element connected to said first detecting means for applying energy of one polarity to said storage capacitor, and a second unidirectional current conducting element connected to said second detecting means for applying energy of the other polarity to said storage capacitor.

2. A loudspeaker telephone set comprising a transmitting channel including a microphone; a receiving channel including a loudspeaker; hybrid means for electrically coupling both said transmitting channel and said receiving channel to a telephone line; first variable impedance means connected in parallel with said transmitting channel; said first impedance means including a serially connected combination of unidirectional current conducting elements; second variable impedance means connected in parallel with said receiving channel; said second impedance means comprising at least one unidirectional current conducting element; a source of potential; a switching circuit exhibiting substantially two states of conduction comprising a three-electrode semiconductor element having a base electrode, an emitter electrode, and a collector electrode; said switching circuit so disposed that said potential source is connected to forward bias the unidirectional conducting elements of said first impedance means when said circuit is in one of said states of conduction, and said potential source is connected to forward bias the unidirectional conducting elements of said second impedance means when said circuit is in the other of said states of conduction; a storage capacitor for controlling the state of said switching circuit connected between said base and emitter electrodes; first detecting means for sensing energy propagating in said transmitting channel; second detecting means for sensing energy propagating in said receiving channel, rectifier means connected to said first detecting means for applying energy of one polarity to said storage capacitor; and rectifier means connected to said second detecting means for applying energy of the other polarity to said storage capacitor.

3. A loudspeaker telephone set comprising a transmitting channel for converting sound waves into voice frequency electrical signals capable of being propagated through a telephone communication link; a receiving channel for converting voice frequency electrical signals into sound waves; hybrid means for electrically coupling said transmitting channel and said receiving channel to a telephone communication link; first variable impedance means including at least one diode connected to dissipate at least a portion of energy propagating through said transmitting channel; second variable impedance means including at least one diode connected to dissipate at least a portion of energy propagating through said receiving channel; a first source of electrical potential; a transistor comprising a base electrode, a collector electrode, and an emitter electrode; said transistor connected to provide a low impedance conduction path for forward biasing the diodes included in one of said variable impedance means when said transistor resides in a state of conduction, and said first source of potential connected to forward bias the diodes included in the other of said variable impedance means when said transistor resides in a state of nonconduction; a second source of electrical potential connected to back bias the diodes included in one of said variable impedance means when said transistor resides in a state of conduction; a third source of electrical potential connected to back bias the diodes included in the other of said variable impedance means when said transistor resides in a state of nonconduction, means for deriving a control signal representative of the difference in magnitudes of energy propagating through said transmitting and said receiving channels; and means for applying said control signal between said base and emitter electrodes so as to govern the state of conduction in which said transistor resides.

4. A loss switching circuit operative to vary the attenuation of voice frequency energy in the transmit channel of a loudspeaker telephone set in an inverse relation to the attenuation of voice frequency energy in the receive channel of said set comprising first variable impedance means including a diode connected in parallel with said transmit channel; second variable impedance means including a diode connected in parallel with said receive channel; a transistor having a base electrode, an emitter electrode, and a collector electrode; means for connecting a first of said diodes to said collector electrode; means for connecting a second of said diodes to said emitter electrode; a first source of potential connected to said emitter electrode; said first potential source being poled to forward bias said first diode when said transistor resides in a state of conduction, and also being poled to forward bias said second diode when said transistor resides in a state of nonconduction; second and third sources of potential respectively connected to said first and second diodes; said second and third sources of potential poled in a direction tending to back bias said first and said second diodes, respectively; a storage capacitor connected between said base and emitter electrodes; means for deriving a control signal having a magnitude representative of the difference in levels of energy propagating in said transmit and said receive channels; and means for applying said control signal to said storage capacitor to regulate the state of conduction in which said transistor resides.

5. A loss switching circuit in accordance with claim 4 wherein a resistor is connected to said collector electrode for diverting current of less than a predetermined magnitude from said first diode.

6. A loss switching circuit in accordance with claim 5 wherein first and second high pass filters are respectively connected to said collector and emitter electrodes.

References Cited in the file of this patent

UNITED STATES PATENTS 2,129,990 Fremery ---------------- Sept. 13, 1938

FOREIGN PATENTS 736,988 Great Britain ----------- Sept. 14, 1955